Aug. 5, 1958
L. D. EVANS ET AL
2,846,541
ROTATIONAL SPEED GOVERNOR
Filed May 13, 1955
2 Sheets-Sheet 1
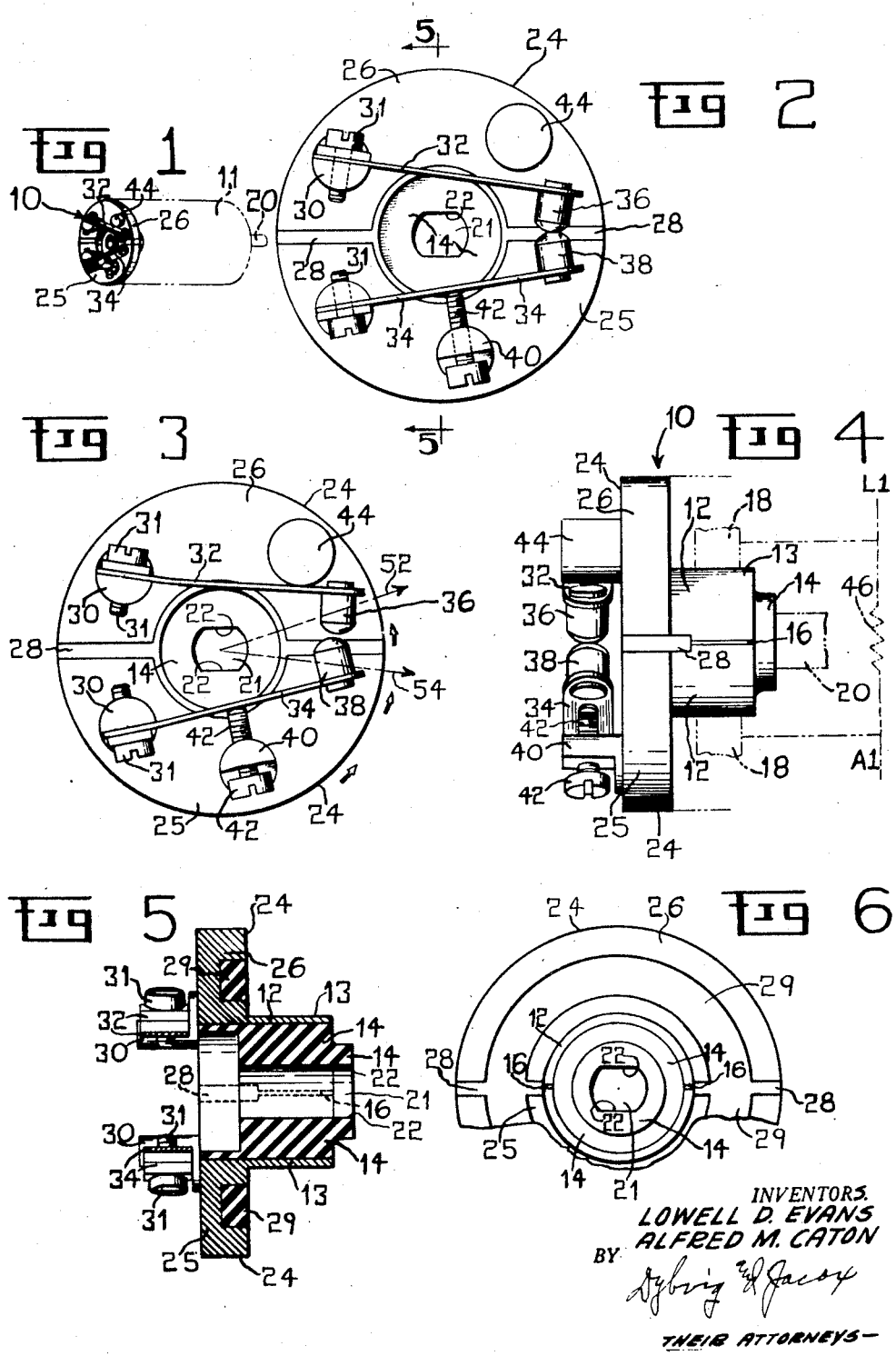
INVENTORS.
LOWELL D. EVANS
ALFRED M. CATON
BY
THEIR ATTORNEYS Aug. 5, 1958 L. D. EVANS ET AL 2,846,541
ROTATIONAL SPEED GOVERNOR
Filed May 13, 1955 2 Sheets-Sheet 2

INVENTORS
LOWELL D. EVANS
ALFRED M. CATON
BY

THEIR ATTORNEYS

__

United States Patent Office 2,846,541
Patented Aug. 5, 1958

2,846,541

ROTATIONAL SPEED GOVERNOR

Lowell D. Evans and Alfred M. Caton, Dayton, Ohio, assignors to Globe Industries, Inc., Dayton, Ohio, a corporation of Ohio Application May 13, 1955, Serial No. 508,250

19 Claims. (Cl. 200—80)

This invention relates to a rotational speed governor. The invention relates more particularly to a speed governor for electric motors. The invention relates will more particularly to a speed governor for high speed motors which are very small in physical size. The invention relates particularly to speed governors for motors having an overall diameter in the order of three-quarters of an inch or smaller. However, the invention is not so limited in that it is also applicable for governing the speed of larger motors and other rotational apparatus.

Many small high speed motors are used in aircraft. It is usually desirable in such applications to maintain constant motor speed. However, in aircraft use, the motors are subjected to wide temperature changes. Furthermore, the applied voltage to the motors often varies considerably. Also, the load applied to the motors may be constantly changing. Numerous problems have long existed in regard to creating a governor which could be applied to these small motors to maintain the speed substantially constant regardless of the variations in temperature, voltage, and load. Numerous types of centrifugal governors or switches have been designed. However, none of these has been found to be suitable for a motor having a very small physical size.

An object of this invention is the provision of a speed governor for motors, which speed governor is capable of maintaining the speed of the motor substantially constant, regardless of changes in load, voltage, and temperature.

Another object of this invention is to provide a rotational speed control governor for small high speed apparatus.

Another object of this invention is to provide a rotational speed governor which is easily adjustable.

Another object of this invention is the provision of a speed governor for small rotors, which speed governor may be sturdily built, is long-lived, and may be constructed at reasonably low costs.

Other objects and advantages reside in the construction of parts, the combination thereof and the mode of operation, as will become more apparent from the following description.

In the drawing:

Figure 1 is a perspective view showing a rotational speed governor of this invention attached to a motor.

Figure 2 is an enlarged end elevational view showing the contact fingers of the governor of this invention when the rotor of the motor is at a speed less than the operating speed of the governor.

Figure 3 is an end elevational view similar to that of Figure 2. However, Figure 3 shows the contact fingers of the governor in positions which they may assume momentarily during governing operation of the device.

Figure 4 is an enlarged side elevational view of a speed governor of this invention.

Figure 5 is a sectional view taken substantially on line 5—5 of Figure 2.

Figure 6 is a fragmentary enlarged end elevational view of the speed governor of this invention looking at the governor from the opposite end from that shown in Figures 2 and 3.

Figure 8:
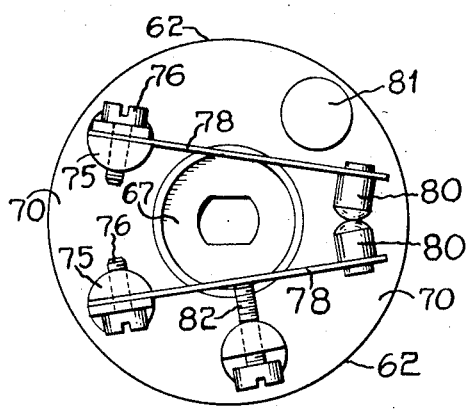
Figure 8 is an enlarged end elevational view of the preferred modification.

Referring to the drawing in detail, a rotational speed governor 10 of this invention may be attached to any suitable rotational device, such as a motor 11, shown in Figure 1. The rotational speed governor 10 comprises a pair of substantially semi-circular segments 12 forming a hollow cylinder 13 similar in appearance to a commutator. The segments 12 are firmly attached to a sleeve 14 made of any suitable insulating material which is relatively unaffected by heat and/or moisture. The sleeve 14 may extend axially slightly beyond the length of the segments 12, as shown in Figures 4 and 5. The straight edges of the segments 12 are slightly separated one from the other so that a narrow space 16 exists between the two segments 12, as shown in Figures 4, 5, and 6. The segments 12 are thus electrically insulated one from the other. The cylinder 13 is adapted to be engaged by a pair of suitable brushes 18.

The sleeve 14 is adapted to attach the segments 12 to a shaft 20. The sleeve 14 has a bore 21 extending therethrough. The bore 21 has two flat surfaces 22 for engagement with complementary flat surfaces of the shaft 20. Any suitable means, such as a clip ring or snap ring, (not shown) is used to retain the sleeve 14 upon the shaft 20 against axial movement.

Attached to the cylinder 13 at one end thereof is a disc 24 in the form of a pair of arcuate concentric flange members 25 and 26 separated by spacer strips 28. The spacer strips 28 are integrally attached to the sleeve 14 and are made of the same material as the sleeve 14. Also integrally attached to the sleeve 14 and made of the same material is a ring 29 which is embedded within the flange members 25 and 26 of the disc 24. The ring 29 also integrally joins the spacer strips 28, as clearly shown in Figure 6. The flange member 25 is integrally attached to one of the segments 12; the flange member 26 is integrally attached to the other segment 12, as best shown in Figures 4 and 5. The segments 12 and the flanges 25 and 26 are preferably made of any suitable conductor material, such as copper and the like.

Due to the fact that the sleeve 14, the ring 29, and the spacer strips 28 are all integral, the flange members 25 and 26 with the segments 12 are firmly retained in concentric relation. The governor of this invention thus withstands high centrifugal forces without relative movement between the flanges 25 and 26 or between the two segments 12.

Integrally attached to each of the arcuate flange members 25 and 26 is a conductor stud 30 extending in a direction parallel to the shaft 20. Attached to one conductor stud 30 by means of a screw 31 is a flexible resilient finger 32. Attached to the other conductor stud 30 by means of another screw 31 is a flexible resilient finger 34. The flexible resilient fingers 32 and 34 are made of any suitable resilient flexible conductor material and are attached at the ends thereof to their respective conductor studs 30. The fingers 32 and 34 extend across the flange members to which they are attached and terminate adjacent the periphery thereof, as shown in Figures 2 and 3.

The finger 32 is provided with a contact 36 at the end thereof and the finger 34 is provided with a contact 38 at the end thereof. The contacts 36 and 38 are normally in engagement one with the other, as shown in Figure 2.

Due to the fact that both of the fingers 32 and 34 are resilient and flexible, the fingers 32 and 34, when resiliently engaged one with the other, act as one long resilient member. The effective resilient length of the one long resilient member formed by the engaged fingers 32 and 34 is substantially equal to the combined resilient lengths of the fingers 32 and 34.

Attached to the flange member 25 is a stud 40 to which is threadedly attached a radially extending adjustment screw 42. The end of the adjustment screw 42 is adapted to abuttingly engage the central portion of the resilient finger 34 for adjustment of the resilient position of the finger 34. Engagement of the contacts 36 and 38 causes flexing of the fingers 32 and 34, thus providing a "wiping" contact action between the contacts 36 and 38, which "wiping" action is adjustable by means of the screw 42. Furthermore, adjustment of the adjustment screw 42 changes the resilient stresses within both the fingers 32 and 34.

Integrally attached to the flange member 26 adjacent the periphery thereof is a protuberance 44 which serves as a balance weight for the disc 24. This protuberance 44 serves to approximately balance the disc 24. However, it may be found necessary to remove portions of the disc 24 at the periphery thereof in order to obtain a degree of balance necessary for the high speed operation to which the governor is subjected.

From the above description, it is understood that the segments 12 of the cylinder 13 and the flange members 25 and 26 of the disc 24 serve as conductor means between the brushes 18 and the fingers 32 and 34. Due to the fact that the spaces 16 and the insulating material 28 separate the segments 12 and the flange members 25 and 26 one from the other, there is direct electrical connection between the segments 12 only when the contacts 36 and 38 of the fingers 32 and 34 are engaged one with the other.

Preferably, the brushes 18 are connected across a resistance, such as a resistance 46 shown schematically in Figure 4, which is electrically in series with a line lead L–1 and an armature lead A–1, supplying electrical energy to the motor 11. Therefore, due to the fact that the contacts 36 and 38 of the fingers 32 and 34 are normally in engagement one with the other, the resistance 46 connected across the brushes 18 is normally shorted out.

When the motor 11 is started, the shaft 20 is caused to increase in speed. Therefore, the centrifugal forces associated with the elements rotating with the shaft 20 increase. As the speed of the shaft 20 approaches a predetermined value, centrifugal forces acting upon the fingers 32 and 34 tend to cause the contacts 36 and 38 to separate one from the other. The finger 34, being engaged by the screw 42 at the midportion thereof, has a shorter effective length in which to flex than does the finger 32. Thus, the contact 36 of the finger 32 tends to move outwardly more readily than does the contact 38 of the finger 34. Centrifugal forces acting upon the contacts 36 and 38 are substantially along radial lines, as indicated by arrows 52 and 54 in Figure 3. As centrifugal force causes outward movement of the contact 36, the resilient action of the finger 34, as determined by the adjusted position of the screw 42, may cause slight following movement by the contact 38. However, centrifugal force also tends to cause outward movement of the contact 38 substantially in a direction as shown by the arrow 54. Figure 3 shows separation of the contacts 36 and 38, one from the other, as the fingers 32 and 34 flex under the influence of centrifugal forces.

This showing of the separation of the contacts 36 and 38 as depicted in Figure 3 may be somewhat exaggerated, due to the fact that during governing operation the contacts separate only slightly. When the contacts 36 and 38 separate, even a slight distance, one from the other, the resistance 46 which is connected across the brushes 18 is automatically inserted into the motor armature circuit and the speed of the motor immediately decreases. As the speed of the shaft 20 decreases, the centrifugal forces tending to cause separation of the contacts 36 and 38 decrease. Therefore, the contacts 36 and 38 are again permitted to come into engagement one with the other. As engagement of the contacts 36 and 38 again occurs, the resistance 46 across the brushes 18 is shorted out and the speed of the motor again increases until separation of the contacts 36 and 38 results.

Thus, it is understood that the contacts 36 and 38 come into engagement one with the other and separate one from the other at a high frequency. Hence, the speed of the motor is maintained at substantially a constant value, as the contacts open and close.

As the contacts 36 and 38 rapidly engage and disengage, during governing action, the rotational speed varies slightly as a very small "hunting" action occurs. Due to the fact that the contacts 36 and 38 are both movable as carried by their respective fingers 32 and 34, the amount of "hunting" action is very small, and thus the amount of speed variation is very small. Also, due to the fact that both of the contacts 36 and 38 are movable under centrifugal forces, the amount of movement of each contact is very small. Therefore, there is a high speed of response and the governor is capable of closely maintaining a desired speed even though there are frequent and rapid fluctuations in load, voltage or temperature. The variation in speed during governing action is much less than if only one of the contacts were movable by centrifugal forces.

The governed speed or operational speed of the motor 11 can be adjusted by means of the adjustment screw 42 which presses against the resilient finger 34. As the adjustment screw 42 presses against the finger 34, it establishes the adjusted position of the finger 34 and also establishes the amount of "wiping" action between the contacts 36 and 38. As the pressure of the contact 38 against the contact 36 is increased, the amount of centrifugal force necessary to separate the contact 36 from the contact 38 increases. Therefore, the speed at which the motor operates increases.

Rotation arrows in Figure 3 indicate counterclockwise rotation; however, substantially the same speed is maintained at a given adjusted position of the screw 42 in either direction of rotation.

The governing speed of the device of this invention is also dependent upon the thickness of the resilient fingers 32 and 34. If the fingers 32 and 34 are made thicker in dimension, the force necessary to separate the contacts 36 and 38 must be greater. Therefore, the governing speed of the device of this invention increases if the thickness of the fingers 32 and 34 is increased.

Figure 7:
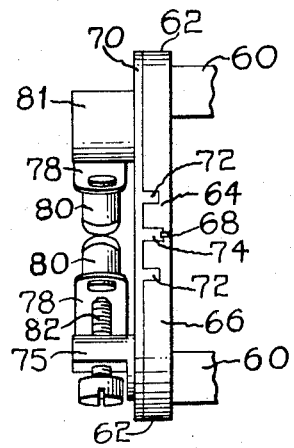
Figure 7 is an enlarged side elevational view of a preferred modification of a speed governor of this invention.
Figure 9:
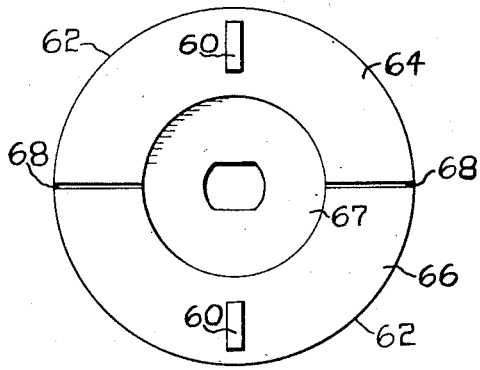
Figure 9 is an enlarged end elevational view looking at the preferred modification from the opposite end from that shown in Figure 8.

Figures 7, 8 and 9 show a preferred modification of the rotational speed governor of this invention. In this preferred modification brushes 60 directly and axially engage the flat surface of an annular disc 62, as shown in Figures 7 and 9. The disc 62 comprises two similar arcuate concentric portions 64 and 66, mounted on a sleeve 67 of insulating material and separated one from the other by a space 68.

A circular sheet of insulating material 70, integral with the sleeve 67, is attached to the surface of the annular disc 62 opposite the surface thereof engaged by the brushes 60. Integral with the sheet of insulating material 70 are strips of insulating material 72 which extend into the arcuate portions 64 and 66 of the disc 62, as clearly shown in Figure 7. Also, a strip of insulating material 74 extends between the arcuate portions 64 and 66 of the disc 62, as shown in Figure 7. Thus, the sleeve 67 and the sheet of insulating material 70, with the strips 72 and 74 integral therewith, firmly secure the arcuate portions 64 and 66 in concentric relation in the form of a disc.

Intergal with the arcuate portions 64 and 66 are conductor studs 75 extending axially therefrom and through the sheet of insulating material 70. Attached to the conductor studs 75 by means of screws 76 are conductor fingers 78. Attached at the end of the conductor fingers 78 are contacts 80. The arcuate portion 64 is shown as being provided with a balance protuberance 81 similar to the protuberance 44 shown in the preferred embodiment.

As shown in Figure 8, a radially extending adjustment screw 82 serves to adjust the resilient position of one of the conductor fingers 78. The governor of the preferred modification thus functions in a manner similar to that discussed with respect to the embodiment disclosed by Figures 1 through 6, but the axial length of the preferred modification is considerably less than the axial length of the embodiment shown in Figures 1 through 6.

Figure 10:
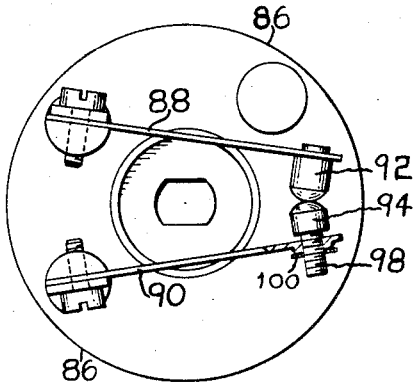
Figure 10 is an enlarged end elevational view, with parts broken away, of another modification of a speed governor of this invention.

Figure 10 shows another modification in the rotational speed governor of this invention. In this modification a disc 86, which may be similar to the disc 24 of the preferred embodiment or similar to the disc 62 of the preferred modification, is provided with conductor fingers 88 and 90. The conductor finger 88 has a contact 92 at the end thereof rigidly secured thereto. The conductor finger 90 has a contact 94 at the end thereof adjustably attached thereto by means of a threaded stud 98. The adjusted position of the stud 98 may be locked by means of a nut 100.

Thus, in this modification shown in Figure 10, the resilient position of the fingers 88 and 90 may be adjusted by adjustment of the position of the contact 94 with respect to the finger 90. Adjustment of the contact 94 changes the distance between the fingers 88 and 90 and hence changes the resilient or flexed position of the fingers 88 and 90. Thus, adjustment of the stud 98 adjusts the speed at which the governor operates.

The rotational speed governor of this invention may be applied to large motors as well as to small motors, and may also be applied to other types of apparatus.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. In a centrifugal governor for attachment to a rotatable shaft, the combination comprising a disc adapted to be mounted upon the shaft concentric therewith, the disc including two half-sections insulated one from the other, a cylinder including two arcuate segments attached to the disc concentric therewith, there being one segment of the cylinder attached to each half-section of the disc, a pair of flexible resilient conductor fingers attached to the disc, there being one finger attached to each half-section of the disc, each finger being attached at one end thereof to its respective half-section of the disc adjacent the periphery thereof, the other ends of the fingers being in resilient contact one with the other, and means for adjusting the resilient position of one of the fingers thus changing the resilient contact pressure between the ends of the fingers, the ends of the fingers being urged by centrifugal force to flex and separate when rotational speed of the disc is above a predetermined value.

2. In a centrifugal switch comprising a rotatable disc, a pair of resilient flexible contact fingers, each of the fingers being attached at one end thereof to the disc, the other end of the fingers being freely flexible and in resilient engagement one with the other, the total effective resiliency of the fingers being greater than the resiliency of either finger, centrifugal forces causing flexing of the fingers as each finger moves with respect to the other finger, the centrifugal forces causing separation of the fingers upon rotation of the switch above a predetermined speed.

3. In a speed control device comprising a rotatable shaft, a pair of similar concentric arcuate segments electrically insulated one from the other and attached to the shaft, a pair of resilient fingers, there being one finger attached to each of the segments, each finger being attached at one end thereof to its respective segment, the other end of the fingers being in resilient engagement one with the other when the rotational speed of the shaft is below a predetermined value, centrifugal forces causing separation of the fingers when the rotational speed of the shaft is above a predetermined value, and a pair of contact brushes in contact with the segments.

4. A rotatable speed control device comprising a rotatable body, a pair of electric conductors attached to the rotatable body and electrically separated one from the other, a pair of electrically conductive contact members rotatable with the rotatable body, there being one electrically conductive contact member electrically connected to each of the electric conductors, both of the electrically conductive contact members being movable by centrifugal forces during rotation of the rotatable body, both of the electrically conductive contact members being movable with respect to the rotatable body, the electrically conductive contact members being in engagement one with the other when the rotational speed of the rotatable body is below a given value, the electrically conductive contact members being separated one from the other by centrifugal forces when the rotational speed of the rotatable body is above a given value.

5. A rotational speed governor comprising a rotatable body including a pair of conductor segments, a pair of resilient flexible fingers, there being a resilient flexible finger electrically connected to each of the segments, the fingers being in resilient engagement one with the other forming a resiliently stressed spring member having an effective spring length substantially equal to the combined spring lengths of the fingers, and means for adjusting the resiliently stressed condition of the fingers.

6. A rotational speed control device comprising a rotatable body including a pair of electric conductor segments electrically separated one from the other, brush means engaging the conductor segments, a pair of resilient flexible conductor fingers, there being one conductor finger attached to each of the conductor segments, each of the conductor fingers having a freely movable end portion, the freely movable end portions of the conductor fingers being in resilient engagement one with the other, the conductor fingers thus forming a spring member having an effective spring length longer than either of the conductor fingers.

7. A rotational speed control device comprising a rotatable body including a pair of electric conductor segments electrically separated one from the other, a pair of conductor fingers, there being one conductor finger electrically connected to each of the segments, each of the conductor fingers having a contact portion movable by centrifugal forces during rotation of the body, the contact portions of the fingers being in engagement one with the other when the rotational speed of the body is below a given value, the contact portions of the fingers being separated one from the other by centrifugal forces when the rotataional speed of the body is above a given value.

8. A speed control device for attachment to a rotatable shaft comprising a rotatable support structure having means for attachment to the shaft, the rotatable support structure including two conductor sections electrically insulated one from the other, brush means for engaging the surface of the rotatable support structure, a pair of flexible resilient contact fingers, there being one contact finger electrically connected to each of the sections and rotatable with the rotatable support structure, each of the contact fingers having a portion thereof movable by centrifugal forces, said portions of the contact fingers being in engagement one with the other when the rotatable support structure is below a predetermined value of rotational speed, said portions of the contact fingers being disengaged by centrifugal forces when the rotatable support structure is above a predetermined value of rotational speed, said predetermined value of rotational speed being dependent upon the flexed position of the contact fingers, and adjustment means for changing the flexed position of the contact fingers.

9. A rotational speed device comprising a pair of rotatable segments, the segments being electrically separated one from the other, a pair of electrical contact members carried by the segments and disposed adjacent the periphery thereof, there being one electrical contact member electrically connected to each of the segments, resilient means urging the electrical contact members one toward the other, the electrical contact members being in engagement one with the other when the rotational speed of the segments is below a given value, both of the electrical contact members being movable by centrifugal forces and separable one from the other when the rotational speed of the segments is above the given value.

10. A rotational speed governor comprising a plurality of rotatable conductor segments, electrical brush means engageable with the conductor segments, a plurality of resilient elongate conductor fingers, there being one conductor finger attached at one end thereof to each of the conductor segments, each of the conductor fingers having a portion thereof resiliently movable under influence of centrifugal forces, said portions of the fingers being normally in resilient engagement one with the other, the total effective resiliency of the fingers being greater than the resiliency of either finger, said portions of the conductor fingers thus being in engagement one with the other when the speed of rotation of the governor is below a predetermined value, said portions of the conductor fingers being separated one from the other by centrifugal forces when the speed of rotation of the governor is above the predetermined value.

11. A centrifugal speed control device comprising a pair of rotatable arcuate conductor segments electrically separated one from the other, electrical brush means engageable with the segments, resilient conductor means firmly attached to each segment and rotatable therewith, the conductor means of each segment being resiliently engageable with the conductor means of the other segment when the rotational speed of the segments is less than a predetermined value, the conductor means of each segment being freely movable and separable from engagement with the conductor means of the other segment by centrifugal forces when the rotational speed of the segments is above the predetermined value.

12. A centrifugal speed control device comprising a pair of concentric arcuate segments, each of the arcuate segments having an arcuate groove therein substantially concentric therewith, a strip of insulating material disposed between the arcuate segments, a ring integral with the strip of insulating material and disposed within the groove of the arcuate segments, the ring retaining the arcuate segments in concentric relation and in firm engagement with the strip of insulating material, a pair of conductor fingers, there being one conductor finger attached to each arcuate segment, each conductor finger having a movable portion thereof extending toward the other conductor finger, said portions of the conductor fingers being in engagement one with the other when the centrifugal speed control device is below a given value of rotational speed, said portions of the conductor fingers being separated one from the other by centrifugal forces when the rotational speed of the control device is above a given value.

13. A rotational speed control device comprising a sleeve consisting of insulating material, a pair of arcuate segments attached to the sleeve forming a cylinder thereon, the arcuate segments being insulated one from the other, a pair of arcuate flange members, there being an arcuate flange member attached to each of the arcuate segments at one end thereof, the arcuate segments being spaced one from the other, each of the flange members having a groove therein, an endless strip of material disposed within the grooves of the flange members, the endless strip of material being integral with the sleeve, the endless strip of material retaining the flange members in concentric relation, resilient flexible switch means attached to each of the flange members and electrically connected to the arcuate segments.

14. A rotational speed governor comprising a sleeve, a pair of arcuate segments attached to the sleeve at the periphery thereof forming a cylinder thereon, the arcuate segments being electrically insulated one from the other, a pair of arcuate concentric flange members, there being one flange member attached to each of the arcuate segments, a spacer member of insulating material being disposed between the flange members, the spacer member being integral with the sleeve, the flange members having an arcuate groove therein concentric therewith, a ring disposed within the arcuate groove of the flange members retaining the flange members in concentric relation, the ring being integral with the sleeve and the spacer member, a pair of resilient flexible conductor fingers, there being one conductor finger attached to each of the flange members, and brush means positioned in slidable engagement with the arcuate segments.

15. A rotational speed control device comprising a rotatable body including a pair of electric conductor segments electrically separated one from the other, a pair of resilient flexible conductor fingers, there being one conductor finger attached to each of the segments, the fingers having freely movable end portions in resilient engagement one with the other, the fingers thus forming a spring member having an effective spring length longer than either of the fingers, and means for adjusting the effective spring length of the spring member formed by the fingers.

16. A rotational speed governor comprising a rotatable body including two conductor sections electrically insulated one from the other, brush means for engaging the surface of the rotatable body, a pair of flexible resilient contact fingers, there being one flexible resilient contact finger electrically connected to each of the conductor sections and rotatable with the rotatable body, the contact fingers being freely flexible and engageable one with the other, the contact fingers being in engagement one with the other when the rotatable body is below a predetermined value of rotational speed, the contact fingers being disengaged one from the other by centrifugal forces when the rotatable body is above the predetermined value of rotational speed, and adjustment means engageable with one of the contact fingers for changing the flexed position of the contact fingers.

17. A rotational speed governor comprising a rotatable support structure, a resilient body attached to the support structure, the resilient body including a pair of leaf spring fingers, each of the leaf spring fingers being attached adjacent one end thereof to the support structure, the other end of each of the spring fingers being freely flexible and resiliently movable, the freely flexible ends of the spring fingers being engageable one with the other causing resilient stresses within the resilient body, the effective resilient stresses within the resilient body being substantially equal to the combined resilient stresses within the spring fingers, and means for adjusting the resilient stresses within the resilient body, the freely flexible ends of the spring fingers being disengaged one from the other by centrifugal forces when the rotational speed of the support structure exceeds a predetermined value, the predetermined value being adjustable by adjustment of the effective resilient stresses of the resilient body.

18. A governor unit adapted to maintain the speed of a governed unit at a pre-selected speed, comprising a rotative member, a pair of resilient contact members mounted thereon, a contact element on each of said members at the outer end thereof and so arranged as to be movable in response to centrifugal forces, the ends of the contact members being in resilient engagement one with the other at the location of their contact elements, said contact members being mounted astride a diametral plane of the rotative member, the construction and arrangement being such that both contact members move away from each other under the action of centrifugal force when the rotational speed of the rotative member reaches a pre-determined value.

19. A centrifugal switch comprising, in combination: a rotatable disc; a pair of resilient flexible contact fingers mounted at one end on the disc; the other ends of the fingers bearing contact elements and being freely flexible and in resilient engagement one with the other; said contact fingers being mounted astride a diametral plane of the disc, the construction and arrangement being such that centrifugal forces cause flexing of the fingers as each finger moves with respect to the other finger and also causes separation of the fingers upon rotation of the disc above a pre-determined value.

References Cited in the file of this patent

UNITED STATES PATENTS

| 2,617,904 | Anderson | Nov. 11, 1952 |

FOREIGN PATENTS

| 374,560 | Germany | Apr. 25, 1923 |
| 716,717 | Great Britain | Oct. 13, 1954 |